United States Patent Office 3,533,924
Patented Oct. 13, 1970

3,533,924
METHOD OF PRODUCING ALUMINUM FLUORIDE
Arnfinn Ve, Bergen, Norway, assignor to Elektrokemisk A/S, Oslo, Norway, a corporation of Norway
No Drawing. Filed Jan. 13, 1967, Ser. No. 608,984
Int. Cl. C22d 3/12; C01f 7/50
U.S. Cl. 204—67                               8 Claims

ABSTRACT OF THE DISCLOSURE

Aluminum fluoride is precipitated from a supersaturated solution thereof by adding aluminum oxide as precipitation nuclei to the solution. The precipitate thus recovered is a mixture of aluminum fluoride and aluminum oxide which, after drying and calcining, may be used as feed for electrolytic cells which produce aluminum by melt electrolysis.

---

This invention relates to a method of producing aluminum fluoride.

As is known, aluminum fluoride is produced by precipitation of the trihydrate, $AlF_3 \cdot 3H_2O$, from a supersaturated solution of $AlF_3$ which is formed by reacting aluminum metal, aluminum hydroxide, bauxite, etc. with fluorine-containing materials such as HF, $H_2SiF_6$, $HBF_4$, etc. It is also known that the addition of $AlF_3 \cdot 3H_2O$ as precipitation nuclei and the elevation of temperature to 75–100° C. will increase the yield and speed of this precipitation process.

Nevertheless, the conventional process presents two disadvantages in that in order to achieve the highest precipitation efficiency, relatively high fluorine concentrations, equivalent to 15% HF or more, are necessary in carrying out the initial reaction to form the supersaturated $AlF_3$ solution and, secondly, even at the highest efficiency a significant amount of dissolved $AlF_3$ remains unprecipitated from the solution. For example, an acid which contains 15% HF, when completely reacted with aluminum hydroxide, will form a supersaturated $AlF_3$ solution containing about 220 grams $AlF_3$ per liter. In the most favorable precipitation temperatures of 75–100° C., the solubility of $AlF_3$ is about 10–15 grams per liter and therefore a precipitation efficiency of about 95%

$$\left( \text{i.e.} \ \frac{220-10}{220} \times 100 \right)$$

theoretically should be attained from a supersaturated $AlF_3$ solution derived from 15% HF. However, in practical operations, the precipitation either stops or proceeds too slowly when the concentration of dissolved $AlF_3$ diminishes to 20–30 grams per liter and so a precipitation efficiency of only about 90% or less can be realized.

The precipitation efficiency drops quite considerably if lower fluorine concentrations are used in the initial reaction to form the supersaturated $AlF_3$ solution. Again to illustrate by way of example, an acid of 5% HF concentration reacted completely with aluminum hydroxide will form a supersaturated $AlF_3$ solution containing about 70 grams $AlF_3$ per liter. But precipitation of such a solution with the aid of 90° C. temperature and added $AlF_3 \cdot 3H_2O$ nuclei results in a dissolved, unprecipitated $AlF_3$ concentration of about 15 grams per liter. This represents a precipitation efficiency or yield of less than 80% in relation to the total original $AlF_3$ content of the solution.

It has now been discovered that the precipitation of aluminum fluoride from supersaturated solutions thereof is materially enhanced by the use of commercial aluminum oxide, $Al_2O_3$, as the precipitation nuclei instead of $AlF_3 \cdot 3H_2O$ as has been customary in the prior art. By use of $Al_2O_3$ precipitation nuclei, it has been found possible to achieve a precipitation yield of 99% of the total dissolved $AlF_3$ in the original supersaturated solution thereof, leaving only 1% still dissolved as compared to the 10% or more which cannot be precipitated in the conventional process. The invention therefore is based on an unexpected discovery that commercial aluminum oxide has a remarkable affinity for dissolved $AlF_3$ whereby a coprecipitate aluminum fluoride and aluminum oxide may be utilized as the means for recovering substantially all dissolved $AlF_3$ in a supersaturated solution thereof.

The invention involves still another surprising and unexpected aspect inasmuch as the 99% precipitation efficiency it affords may be achieved with relatively low concentration $AlF_3$ solutions formed, for example, by completely reacting an acid containing 5% HF with aluminum hydroxide. As previously explained, the efficiency of conventional precipitation processes diminishes as the original HF concentration decreases, but in the present invention just the opposite is the fact. This gives a very important practical advantage when the process of the invention is operated in plants which produce aluminum by the conventional melt electrolysis process. In such plants, the off gases from the aluminum furnaces contain fluoride which is extracted by washing the off gases with water prior to release of the gases into the atmosphere. The wash water accumulates 3 to 5% of HF and is often called "tower acid." This tower acid may be completely reacted with aluminum hydroxide and then the resulting dissolved $AlF_3$ may be substantially completely recovered with the aid of aluminum oxide precipitation nuclei in accordance with the invention. The resulting coprecipitate of aluminum fluoride and aluminum oxide, after drying and calcining, can be recycled to the aluminum electrolytic cells whereby a definite economic savings is achieved.

The process of the invention broadly comprises adding aluminum oxide as precipitation nuclei to a supersaturated solution of aluminum fluoride to form a coprecipitate of the two salts. The amount of added aluminum oxide may vary over a wide range. Generally speaking, the weight ratio of added aluminum oxide to dissolved aluminum fluoride may be from about 0.5:1 to about 10:1. As the weight ratio increases, the precipitation yield also will usually increase. Therefore, for best results, the higher ratios ranging from about 2:1 to about 5:1 are preferred.

In order to maintain the optimum speed of precipitation, it is also preferred to add the aluminum oxide to the $AlF_3$ solution with vigorous mechanical agitation. Also, if desired, the temperature may be elevated in conventional manner to within the range of 75–100° C. to aid precipitation although this is not essential.

The process of the invention may be carried out in one step whereby all the aluminum oxide is added to the total amount of $AlF_3$ solution that is being treated. Alternatively, precipitation may be carried out in two steps with addition of aluminum oxide nuclei or conventional $$AlF_3 \cdot 3H_2O$$

nuclei in the first precipitation step followed by addition of aluminum oxide nuclei in the second step to complete precipitation. In either form of the two step process, the first precipitate may be either separated from the $AlF_3$ solution by filtration or filtration may be omitted and the solution subjected to the second precipitation while it contains the first precipitate.

The $AlF_3$ solution may be formed in conventional manner for treatment by the process of the invention. Thus, various aluminum containing materials such as bauxite, aluminum hydroxide and aluminum itself may be reacted with raw materials containing fluorine acids such as HF, $H_2SiF_6$ or $HBF_4$. The concentration of fluorine acid is not critical and, expressed in terms of weight percent of HF, may vary from 3% to 15% and higher. However, as previously noted, special advantages of the invention are achieved when the process thereof is used in conjunction with tower acids having low 3 to 5% HF concentrations. Similar advantages may be derived when the invention is used in conjunction with HF containing solutions which originate from the prohydrolytical decomposition of carbonaceous wastes occurring in the aluminum industry such as used carbonaceous furnace linings.

As mentioned above, the coprecipitate of aluminum fluoride and aluminum oxide recovered by the process of the invention may be dried and calcined in conventional manner and then used as feed material for aluminum electrolytic cells. In general, the temperatures for drying and calcining may vary from about 500° C. to about 1,500° C.

Further details of the invention will be apparent from the following example which constitutes one specific embodiment thereof.

1,000 kilograms of a 5% HF solution was completely reacted with aluminum hydroxide to form a supersaturated solution which contained 70 kilograms of aluminum fluoride. To this was added 250 kilograms of aluminum oxide with vigorous stirring. Agitation was maintained over a four hour period at the end of which a precipitate had formed. The precipitate was filtered, dried and calcined which resulted in 319 kilograms of a product which consisted of 69 kilograms of aluminum fluoride and 250 kilograms of aluminum oxide. The filtrate was analyzed and found to contain only 1 kilogram of dissolved aluminum fluoride. The dried, calcined precipitate was used as raw material for aluminum electrolytic cells.

It will be understood that it is intended to cover all changes and modifications of the preferred embodiments of the invention, herein chosen for the purpose of illustration, which do not constitute departures from the spirit and scope of the invention.

What is claimed is:

1. Method of precipitating aluminum fluoride from a supersaturated solution of aluminum fluoride which comprises adding aluminum oxide to said supersaturated solution of aluminum fluoride to precipitate a major portion of the aluminum fluoride as a coprecipitate comprising said aluminum oxide and said aluminum fluoride.

2. Method as in claim 1 which includes the step of forming said supersaturated solution by reacting aluminum, bauxite or aluminum hydroxide with a fluorine acid comprising HF, $H_2SiF_6$ or $HBF_4$.

3. Method as in claim 1 in which said precipitation is carried out in two steps in which aluminum oxide or aluminum fluoride trihydrate is added in said first step and aluminum oxide is added in said second step.

4. Method as in claim 1 which includes the step of forming said supersaturated solution by completely reacting an HF solution containing from about 3 to about 5% HF with aluminum hydroxide.

5. Method as in claim 1 wherein the weight ratio of said aluminum oxide to said dissolved aluminum fluoride is from about 0.5:1 to about 10:1.

6. Method as in claim 1 wherein said precipitate is dried, calcined and fed to electrolytic cells in which aluminum is produced.

7. Method as in claim 1 carried out at temperatures from about 75° to about 100° C.

8. Method as in claim 1 wherein said aluminum oxide is added with vigorous mechanical agitation of said supersaturated solution.

References Cited

UNITED STATES PATENTS

| | | | |
|---|---|---|---|
| 2,842,426 | 7/1958 | Glocker | 23—88 |
| 2,920,938 | 1/1960 | Matoush | 23—88 |
| 2,920,941 | 1/1960 | Sanlaville et al. | 23—88 XR |
| 3,006,724 | 10/1961 | Harrell | 204—67 XR |

J. H. MACK, Primary Examiner

D. R. VALENTINE, Assistant Examiner

U.S. Cl. X.R.

23—88

PO-1050
(5/69)

UNITED STATES PATENT OFFICE
CERTIFICATE OF CORRECTION

Patent No. 3,533,924    Dated October 13, 1970

Inventor(s) Arnfinn Ve

It is certified that error appears in the above-identified patent and that said Letters Patent are hereby corrected as shown below:

Claims priority, application Norway, January 20, 1966, 161,336

SIGNED AND
SEALED
MAR 2 1971

(SEAL)
Attest:

Edward M. Fletcher, Jr.
Attesting Officer

WILLIAM E. SCHUYLER, JR.
Commissioner of Patents